(12) United States Patent  
Brennan et al.

(10) Patent No.: US 8,738,078 B2  
(45) Date of Patent: May 27, 2014

(54) CERTIFIED 4G MODEM DOCK FOR M2M APPLICATIONS

(75) Inventors: Kevin G. Brennan, Metuchen, NJ (US); Paul R. McDonough, Marlboro, NJ (US); Praveen Atreya, Jersey City, NJ (US); Paul Venizelos, Ridgewood, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 7 days.

(21) Appl. No.: 13/524,810

(22) Filed: Jun. 15, 2012

(65) Prior Publication Data

US 2013/0337867 A1 Dec. 19, 2013

(51) Int. Cl.
*H04M 1/00* (2006.01)

(52) U.S. Cl.
USPC .............. 455/556.1; 455/557; 455/575.1

(58) Field of Classification Search
USPC ............ 455/41.3, 66.1, 67.11, 557, 556.1, 455/554.2, 90.1–90.3, 100, 128; 340/531
See application file for complete search history.

(56) References Cited

U.S. PATENT DOCUMENTS 7,046,166 B2 *   5/2006   Pedyash et al. .......... 340/870.07
7,792,708 B2 *   9/2010   Alva ........................... 705/26.1

* cited by examiner

*Primary Examiner* — Christian Hannon

(57) ABSTRACT

A wireless network modem dock having a case that houses circuitry and a power connector, a data interface, and a user identification reader all connected to the circuitry. In addition, an antenna connector is attached to the case and connected to the circuitry. The circuitry is capable of sending and receiving M2M data through the antenna connector to a wireless network. Further, the case, the circuit, the power connector, the data interface, the user identification reader, and the antenna connector are certified with the wireless network prior to sending or receiving the M2M data.

17 Claims, 3 Drawing Sheets

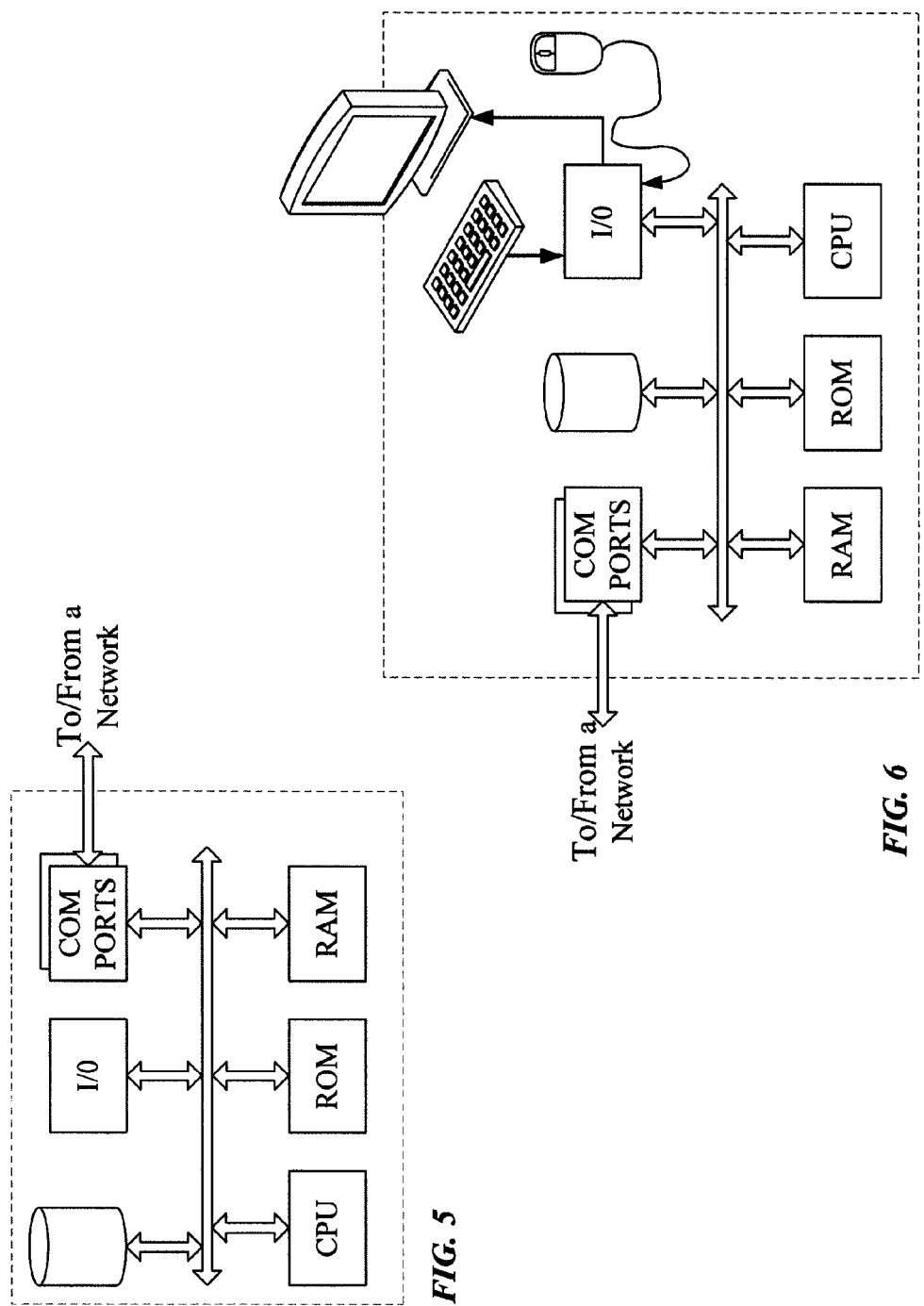

US 8,738,078 B2

CERTIFIED 4G MODEM DOCK FOR M2M APPLICATIONS

BACKGROUND

In recent years, machine-to-machine (M2M) technologies are becoming more and more important in multiple businesses. M2M refers to technologies that allow both wireless and wired systems to communicate with other devices. M2M uses a device (such as a sensor or meter) to capture an event (such as temperature, inventory level, etc.), which is relayed through a network (wireless, wired or hybrid) to an application (software program), that translates the captured event into meaningful information (for example, items need to be restocked). Such communications were originally accomplished by having a remote network of machines relay information back to a central hub for analysis, which would then be rerouted into a system like a personal computer.

Modern M2M communication has expanded beyond a one-to-one connection and changed into a system of networks that transmits data via the expansion of wireless/cellular networks across the world. However, each machine in the M2M wireless system must have a wireless modem to connect to the network. As it stands, each modem must be tested and certified to the wireless/cellular network system it wishes to communicate over. The testing looks at the integration of the modem with the machine to which it is linked and the network. The testing procedure is lengthy and expensive, typically requiring a third party to make the certifications. Additionally, the wireless modem is typically soldered onto a circuit board. This makes the modem semi-permanent to the machine in the M2M wireless system. If the modem malfunctions, an involved procedure to repair or replace the modem on the machine must be undertaken, even during testing.

Further, an obstacle with existing M2M wireless systems is the cost to certify the M2M system or recertify it in the case of an original failure or change in hardware. Currently, the cost to the network operator and to the telecom industry, in general, is between $75,000 and $100,000 for a simple certification without technical issues. The costs only increase from this point.

Hence a need exists for a pre-certified M2M modem dock that can be a turn key solution to businesses employing M2M solutions. Further, the pre-certified M2M modem dock simplifies repair and replacement in the event of malfunction. Additionally, the pre-certified M2M modem dock saves the industry from multiple certification/recertification costs, since the M2M modem dock is pre-certified prior to use with the M2M device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is simplified functional block diagram of a computer that may be configured as a host or server.

FIG. 6 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a pre-certified M2M modem dock allowing an end user to avoid the testing and certification procedures.

Figure 1:
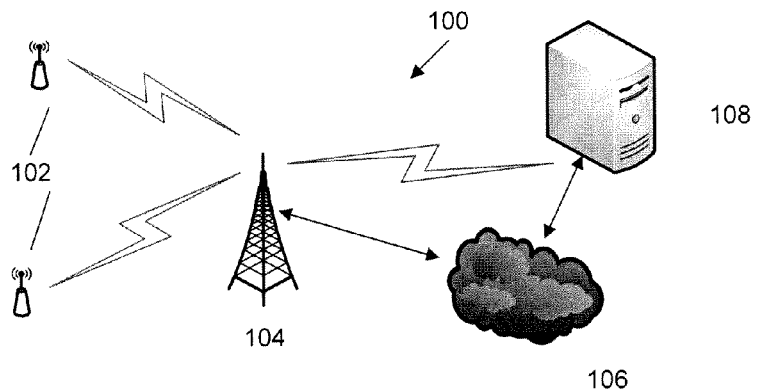
FIG. 1 illustrates a simplified diagram of M2M communications over a network.

Reference now is made in detail to the examples illustrated in the accompanying drawings and discussed below. FIG. 1 illustrates a simplified M2M network 100. M2M devices 102 have cellular/wireless communication modems. M2M devices can include medical device monitoring equipment, ATMs, networked jukeboxes, vending machines, inventory devices, sensors (e.g., lighting, security, temperature, pressure, acceleration, direction (e.g., a compass)), meters (e.g., flow or consumption of gas, water, electricity, blood pressure or flow, parking or tolls), kiosks (e.g., digital signage), etc. The M2M devices 102, as used in the examples herein, are devices having a primary purpose that is other than (i.e., not) network communication and capable of fulfilling this primary purpose without communicating to other M2M devices via the network. Said otherwise, the primary purpose of the M2M device typically includes capturing one or more events. The events can include sales of goods, inventory of goods, or data from the environment (e.g., patient vitals, weather conditions, alarms, user requests for goods, etc.), as well as stream audio/video information to or from the M2M device 102, among others. The M2M device 102 can report, request, or receive information over the wireless network. The information can take most forms transmitted over a wireless network, from data to audio/video streams, as well as control and data traffic signaling. Examples of devices that are not M2M devices, as used herein, are routers, switches, servers, racks, communication and network components, etc.

Information reported, requested, or received by the M2M device 102 can be in different forms. M2M data can be the information generated by the M2M device while fulfilling its primary purpose. For example, patient heart rate, temperature, or muscle contractions, ATM deposits and withdrawals, updating musical selections, frequency of requested songs, inventory, asset tracking, light on/off status, temperature, building attendance, flow rate, valve position, alarm status, and credit card information. Other information passed to the M2M device 102 can be used to update or patch software resident on the M2M device for use in its primary purpose, or information for the M2M device to be refreshed or updated to communicate over a network. Further, the dock 200 can receive information to update itself or set parameters on a UIC.

The M2M devices 102 communicate wirelessly with a cellular network 104. The cellular network 104 can then communicate through a separate network 106, which can be a WAN (wide area network), LAN (local area network), Internet, etc. with an M2M application 108, which can be hosted on a server, personal computer (not illustrated) or mobile station (not illustrated). Mobile stations can typically take the form of portable handsets, smart-phones, tablet computers, or personal digital assistant. In other examples, the cellular network 104 can communicate with the M2M application 108 over its own network 104 as well.

The wireless communication network 104 between the M2M devices 102 and the M2M application 108 might be implemented as a network conforming to an orthogonal frequency division multiplexing long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The M2M device 102 is typically capable of at least one-way data communications (i.e., transmitting information from the M2M device 102 to the M2M application 108) or two-way communications (i.e., back and forth between the M2M device 102 and the M2M application 108).

Figure 2:
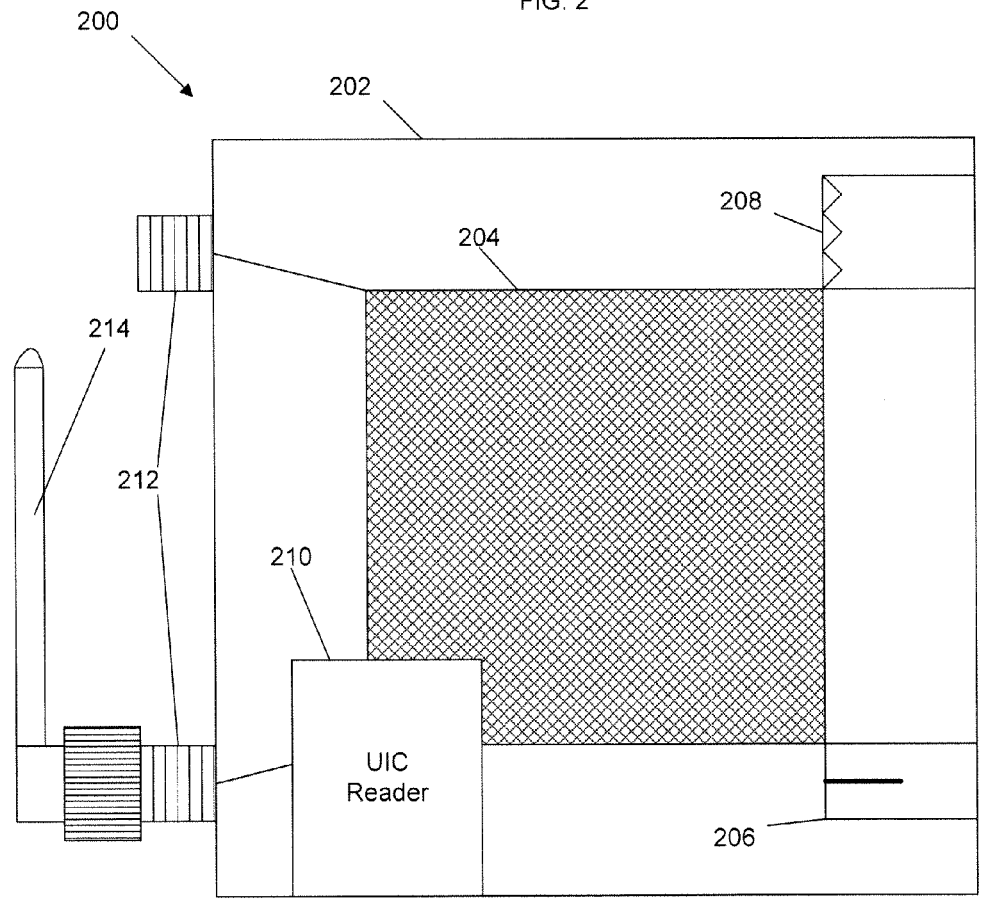
FIG. 2 illustrates an example of a M2M modem dock.

FIG. 2 illustrates an example of a modem dock 200 for M2M communications. The dock 200 includes a case 202 which can be ruggedized to withstand extreme conditions. The extreme conditions can include temperature extremes, impacts, moisture and exposure to liquids, and particulate intrusion. For example, the case 202 can be designed for use at manufacturing facilities, medical facilities, mall kiosks, and construction sites, and in vending machines, sensors, meters, monitors, etc. Multiple versions of the case 202 can be designed for different generic environments the M2M device 102 may be located in. The case 202 can be metal, resin/plastic, a combination of both, or include other materials, depending on the environment and M2M device 102. The case 202 can be designed to mount either internal or external to the M2M device 102.

Internal to the case 202 is circuitry 204. The circuitry 204 can be basic, enough to support the use of a power connection 206, a data interface 208, a user identity card (UIC) reader 210, and one or more radio frequency (RF) antenna connectors 212, all described below. The circuitry 204 may include a sufficient amount of memory (e.g. ROM) to allow the devices 206, 208, 210, 212 to interact. In other examples, the circuitry 204 can include dynamic memory for additional programming (e.g. RAM) and some "intelligence" in the form of a central processing unit (CPU) (both not illustrated).

The power connection 206 can be for a DC power supply. Connection to a standard AC power socket can be made and an internal or external (to the case 202) rectifier can be used convert the supply to DC power. Additionally, the dock 200 can function on a battery supply, which can be internal or external to the case 202. In one example, most or all of the elements 204, 206, 208, 210 of the dock 200 can function off of approximately 5 volts. The power connection 206 powers the circuitry 202, the data interface 208 (if necessary), the UIC reader 210 and can power the signals sent to the RF antenna connectors 212.

The data interface 208 can allow communication between the M2M device 102 and the dock 200. The data interface 208 can take the form of any data communication protocol standard, including, for example, PCIe (Peripheral Component Interconnect Express), PCI-X (Peripheral Component Interconnect-eXtended), and PCI. The data interface 208, in an example, can take the form of a USB (Universal Serial Bus) port, or other communication port. In a further example, if a USB port is used for the data interface 208, power can also be transmitted through the USB port, supplementing or supplanting the power connection 206.

Turning to the UIC reader 210, in some cases, devices communicating on a communication network 104 use a user identity card (UIC) to identify the device on the network 104. The UIC can be a Subscriber Identification Module (SIM) card used in a GSM network, a Universal Integrated Circuit Card (UICC) used in a UMTS network, a Removable User Identity Module (R-UIM) used in a CDMA network, or the like. The UIC is an integrated circuit that securely stores a unique identifier for identifying a device on the mobile network 104. When the UIC is installed in the dock 200 and requires access to the mobile network 104, the UIC is read by the reader 210 that is communicatively coupled to the circuitry 204 to pass the unique identifier from the UIC to the network 104 in order to uniquely identify the dock 200 on the network 104.

The UIC is most often removably inserted into the reader 210. However, some UICs are permanently soldered into the dock 200/reader 208. In an LTE network (Long Term Evolution that involves 3rd generation partnership (3GPP) and 4th generation (4G) technology), SIMs are activated on the network 104 to begin communication between the M2M device 102 and the network 104 through the modem dock 200.

The RF antenna connectors 212 are also connected to the circuitry 204. The connectors 212 can be standard connectors that can attach to a wide variety of antennas 214. The antennas 214 can be designed, like the case 202, to withstand a vast range of environments. The antennas 214 can be standard or customized depending on the location and specific M2M device 102. Further, while the RF antenna connectors 212 and antenna 214 are illustrated in FIG. 2 as exposed, other examples can house the antenna 214 within the case 202.

The dock 200 acts, in one embodiment, merely as the wireless conduit to the communication network 104. In this case, the dock 200 itself has no hardware or software that has a bearing on the operation of the M2M device 102. The M2M device 102 has its own intelligence and transmits M2M data to the dock 200 through the data interface 208 for the dock 200 to send the M2M data wirelessly to the network 104. The dock 200, through the circuitry 204, has no "intelligence" outside being able to communicate M2M data (and wireless protocols to identify the dock 200 to the network 140) to-and-from the wireless network 104.

Further, the dock 200 (visa-a-vie the circuitry 204) and/or the M2M device 102 can be programmed to stream information, i.e., communicate with the M2M application 108 in real-time. Alternately, the dock 200 and/or device 102 can be provided sufficient memory to store the M2M data and communicate it to the M2M application at specific or random intervals, based on specific increments (e.g., every hour), a particular instant (e.g., 4 am every day), or a specified event (e.g., a request from the M2M application, when memory reaches a certain capacity, number of sales, low inventory, money collected, specified temperature), etc. In other examples, the data can be requested or transmitted periodically (by messages initiated from the network) or it can be user initiated by directly by manipulating the M2M device 102 or the dock 200.

Figure 3:
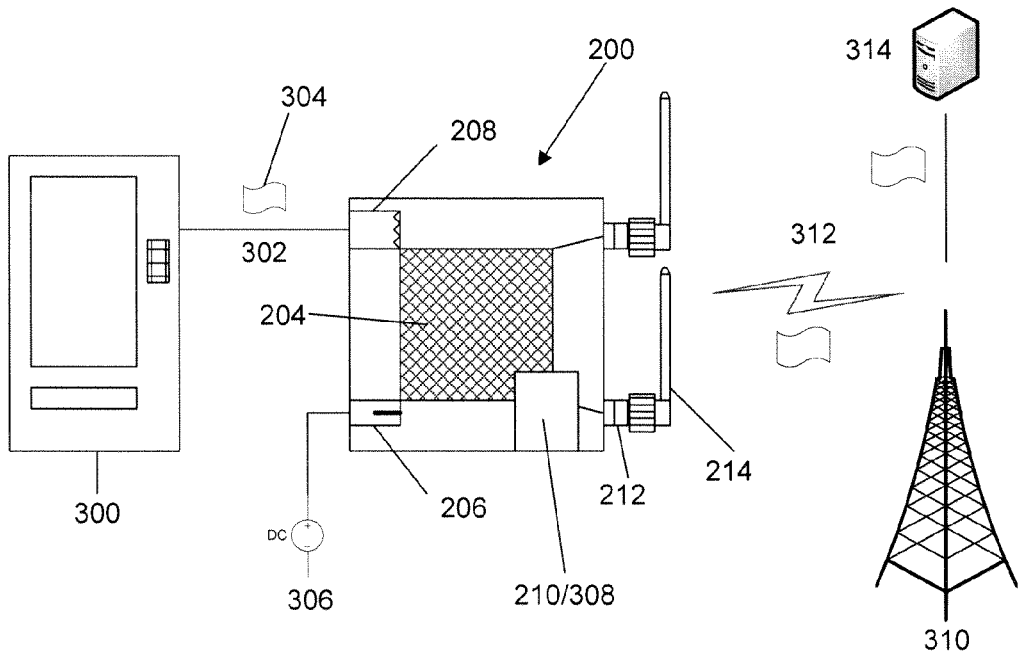
FIG. 3 illustrates a diagram of a M2M device communicating with a wireless network using an example of a modem dock.

In an example, the circuitry 204 is programmed with instructions capable of receiving M2M data from the data interface 208 and transmitting the M2M data through the antenna connector 212 to the wireless network 104. Data types can include Over the Air downloadable M2M configuration and authentication data, and Internet application traffic to and from the dock and the wireless network. FIG. 3 illustrates an M2M device, which in this example is a vending machine 300, linked to the dock 200 via a communication line 302. The dock 200 can be mounted to the outside of the vending machine 300 by connectors on the case 202. Connectors can be any means by which to attach the two dock 200 and machine 300, including permanent or temporary attachment mechanisms such as adhesive, mechanical fasteners, or welds. Alternately, the dock 200 can be mounted internal to the vending machine 300. The antenna connector 212 can be extended outside the machine 300 or just the antenna 214 can be placed outside, while the remaining portion of the dock 200 is mounted inside the machine 300.

The communication line 302 from the vending machine 300 connects to the data interface 208, and in one example the data interface 208 can be a USB port. The vending machine 300 transmits M2M data 304 over the communication line 302 to the dock 200. The dock 200 is powered, in this embodiment, by DC power supply 306 through the power connection 206. The power supply 306 can be independent of the vending machine 300 or the dock 200 can draw power from the same supply as the vending machine 300.

In the example below, the certification, activation and authentication of the dock 200 is discussed. With typical M2M communication devices, each M2M communication device can be built for the specific M2M device. The combination then has to be certified with the particular network provider for use on the network. Testing and certification can involve meeting FCC (Federal Communications Commission), industry, and network provider standards. Some of the standards that have to be met are 3GPP Release 8 and the Telecommunications Industry Association Interim Standard (TIA/IS) 856. Some of these standards are functions of the hardware used to build the M2M communication device. In these instances, once the device is certified using that specific hardware, any hardware changes (e.g., changing antennas) result in requiring the new configuration to be certified. This is a timely and expensive process. The time and expense increase if changes to the M2M device also need to be made.

In contrast, the configuration within the dock 200, i.e., the case 202, circuitry 204, power connection 206, data interface 208, UIC reader 210, antenna connectors 212, and antenna 214 can all be tested and certified independent of the M2M device 102. Different cases 202, data interfaces 208, UIC readers 210 and antennas 214 can be pre-certified in many to all feasible combinations so parts can be mixed and matched to specific M2M devices or their environments. Given some examples of the dock 200, the M2M device may need to change slightly to accommodate the dock 200, but that typically does not require a recertification process.

Once certified in multiple configurations, the dock 200 with the proper configuration for the M2M device 102 and environment can be communicatively attached to the M2M device 102. This can be a removable attachment so the dock 200 can be swapped out of the M2M device 102 at any time. Thus, the dock 200 may not be soldered or hard wired into the M2M device 102. This example allows the dock 200, or components of the dock (e.g., the antenna 214, the communication line 302, the SIM card 308, etc.), to be swapped out and replaced due to malfunction or if the environmental conditions change requiring a change in configuration of the dock 200. The M2M device 102 can now communicate with the network 104 without any further testing required. Further, as above, if the same M2M devices require different configurations of dock 200 based on environmental considerations or other variants, the certification process does not need to be repeated, the new portion of the dock 200 for the change of configuration can be swapped in.

Activation and authentication with the network 104 can be exchanging standard network protocols to identify the dock 200. The activating and authenticating information can be read from the UIC reader 210 from the information resident on the SIM card 308. Again, the dock 200 can be pre-tested to assure that the activation and authentication with the network happens without problems. SIM cards 308 can be preinstalled prior to connecting to the M2M device 102, or installed after the dock 200 is in communication with the M2M device 102.

Additionally, a LINUX based connection manager software application may be pre-installed in the dock, to further facilitate the integration and the interaction between the dock enabled Host device and the wireless network. Previously, the use of stand-alone modules necessitated additional software development by the M2M product developer to allow this communication to occur. All told, this allows the dock 200 to be an off-the-shelf solution for M2M communication. In that, either pre-set configurations can be already available or pieces can be mixed and matched as the situation warrants. For example, users can be offered to select a case 202 that is "normal" or "ruggedized" and antennas 214 that are exposed or embedded. The dock 200, being fully certified to network operator requirements, and requiring no additional circuitry or software, allows the Host device manufacturer to eliminate a broad category of Telecommunications Industry standard testing (3GPP, CTIA) reducing both development time and cost (approximately $72 k to complete certification testing at an external Test Lab)

Next, the dock 200 in this example is already certified and activated and authenticated with the wireless network 310 and a SIM card 308 is inserted in UIC reader 210. The circuitry 204 receives the M2M data 304 and begins a wireless communication session 312 with the network 310. This session 312 includes passing information from the SIM card 308 to the network 310 for identification. In this example, the dock 200 is making a "call" to the M2M application 314.

The circuitry 204 is programmed to begin the wireless communication session 312 and exchange all of the proper protocols to communicate over the wireless network 310. The M2M data 304 is transmitted through the antenna connectors 212 to the antenna 214, to the network 310, and finally to the M2M application 314. The reverse flow of M2M data can also occur, where the M2M application 314 "calls" the vending machine 300 to pass instructions. M2M data 304 can include error messages, inventory status, credit card authorization, price changes, alarms, etc.

Figure 4A:
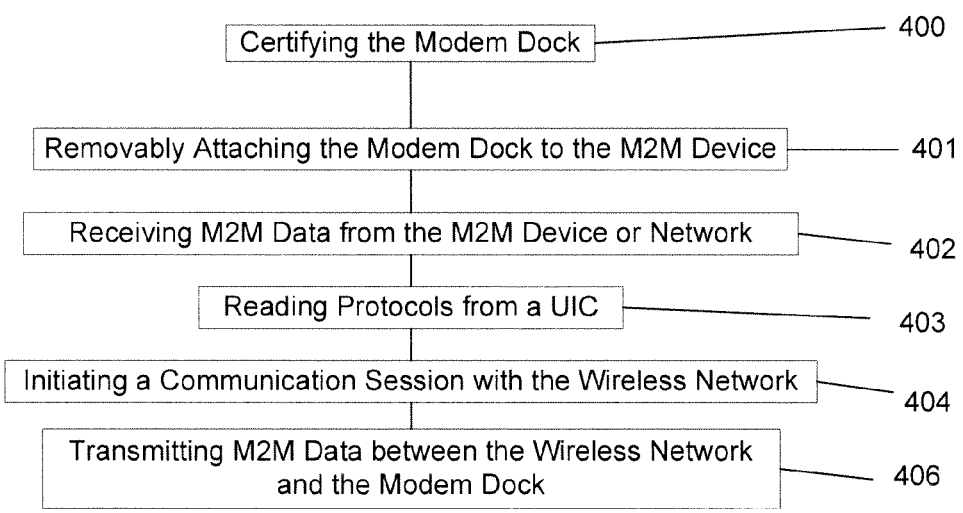
FIG. 4A illustrates a method for M2M communication using an example of a modem dock.

FIG. 4A illustrates a method for M2M communication using at least one example of the dock 200. Before communication with the M2M device 102 (i.e., sending or receiving M2M data), the dock 200 is certified to communicate with the wireless network 104 (step 400). This may, for example, mean that the dock 200 and the M2M device 102 have never been connected (the dock 200, for example, having been certified when manufactured), or if connected, exchanged M2M data. Once the modem dock 200 has been certified, it can be removably connected to the M2M device 102 (step 401) and begin to receive M2M data from the M2M device and for the M2M device (step 402). The modem dock 200 initiates a communication session with the wireless network 104 (step 404). The communication session (step 404) can be initiated before or after receiving the M2M data depending on where the M2M data originates from. In one example, if the M2M device 102 is sending the M2M data to the modem dock 200, the session can be initiated after receipt. However, if the M2M data is being received from the network 106 for the dock 200 to pass to the M2M device 102, the session (step 404) should be initiated first.

Before or during the initiation of the communication session (step 404), the wireless protocols and identifiers can be read from the UIC 308 disposed in the modem dock 200 (step 403). The protocols and identifiers can be the settings stored on the UIC for identification on the wireless network. For example, a SIM card stores a unique International Mobile Subscriber Identity (IMSI) identifier, a mobile directory number (MDN) and/or mobile identification number (MIN), and a MSISDN (sometimes known as the "Mobile Subscriber Integrated Services Digital Network Number"). Once the session has begun, the dock 200 can transmit the M2M data to and from the wireless network 104 (step 406).

Figure 4B:
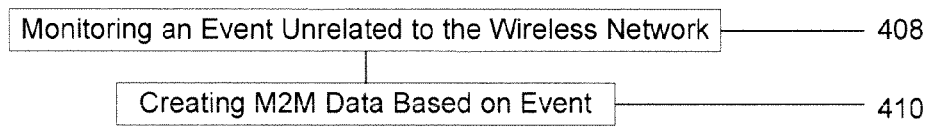
FIG. 4B illustrates a method for M2M data generation.

FIG. 4B illustrates steps that can be taken by the M2M device, including monitoring an event unrelated to the wireless network (step 408). These events are as discussed above, and related to the primary purpose of the M2M device 102. The M2M device 102 can then create the M2M data based on the monitored event (step 410). Also, as above, the M2M data is related to the event, as an example, the event can be vending machine sales (either immediate or collected over a predetermined period) and the M2M data can be inventory and gross profits.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data, e.g., files used for the various country determination and technology detection lists. For downloading and installation, however, the software is stored within the general-purpose computer platform.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from the server or other computer of the mobile network operator into the dock. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless network modem dock, comprising:
    a case;
    a circuit housed in the case;
    a power connector electrically connected to the circuit and housed in the case;
    a data interface, housed in the case, and electrically connected to the circuit;
    a user identification reader electrically connected to the circuit and housed in the case; and
    an antenna connector attached to the case and electrically connected to the circuit,
    wherein the circuit comprises instructions capable of sending and receiving machine-to-machine data through the antenna connector to a wireless network, and
    wherein the case, the circuit, the power connector, the data interface, the user identification reader, and the antenna connector are certified with the wireless network prior to sending or receiving the machine-to-machine data or being removably installed in a device that generates the machine-to-machine data.

2. The wireless network modem dock of claim 1, wherein the case is configured to be installed in the device.

3. The wireless network modem dock of claim 1, wherein the circuit only comprises instructions to at least one of send or receive the machine-to-machine data respectively to or from the wireless network and a machine-to-machine device.

4. The wireless network modem dock of claim 3, wherein the machine-to-machine device has a primary purpose which is not communication with the wireless network.

5. The wireless network modem dock of claim 4, wherein the primary purpose is collecting machine-to-machine data based on an event.

6. The wireless network modem dock of claim 1, wherein the user identification reader is a SIM card reader, and the dock further comprises a SIM card disposed in the SIM card reader.

7. The wireless network modem dock of claim 1, consisting essentially of:
    a user identity card interfacing with the user identification reader; and
    an antenna electrically connected to the antenna connector;
    wherein the case, the circuit, the power connector, the data interface, the user identification reader, the user identity card, the antenna connector and the antenna are certified with the wireless network prior to sending or receiving the machine-to-machine data or being removably installed in a device that generates the machine-to-machine data.

8. A method of machine-to-machine communication, comprising the steps of:
    prior to receiving machine-to-machine data from a machine-to-machine device, certifying a modem dock to communicate with a wireless network;
    receiving machine-to-machine data, by a processor in the modem dock, from at least one of the machine-to-machine device and the wireless network;
    in response to receiving the machine-to-machine data, retrieving authentication information from a user identity card inserted in a user identification reader of the modem dock;
    initiating a communication session with the wireless network based on the retrieved authentication information; and
    in response to establishing the communication session with the wireless network, transmitting the machine-to-machine data between the modem dock and the wireless network.

9. The method of claim 8, further comprising the step of reading protocols for the wireless network from the user identity card disposed in the modem dock.

10. The method of claim 8, further comprising the steps of:
    monitoring, by the machine-to-machine device, an event unrelated to the wireless network; and
    creating the machine-to-machine data based on the monitored event.

11. The method of claim 8, wherein initiating a communication session comprises the steps of:
    reading, by a user identification reader, identifiers and wireless protocols from a subscriber identification module interfacing with the user identification reader; and
    using the read identifiers and wireless protocols to initiate a communication session between the machine-to-machine device and the wireless network.

12. The method of claim 11, wherein the subscriber identification module is installed in the modem dock prior to the modem dock being connected to the machine-to-machine device.

13. The method of claim 11, wherein the subscriber identification module is installed in the modem dock after the modem dock is connected to the machine-to-machine device.

14. The method of claim 8, further comprising steps of:
receiving, from a machine-to-machine application, instructions to execute a user identification reader, to read identifiers and wireless protocols from a subscriber identification module interfacing with the user identification reader; and
using the read identifiers and wireless protocols to initiate a communication session between the machine-to-machine device and the wireless network.

15. The wireless network modem dock of claim 1, wherein the circuit comprises:
a memory; and
a processor, wherein the processor is configured to perform various functions, including functions to:
receive machine-to-machine data through the data interface;
store the machine-to-machine data in the memory; and
transmit the stored machine-to-machine data to a machine-to-machine application executing on the wireless network at the occurrence of a specified event.

16. The wireless network modem dock of claim 15, wherein the specified event is one of a request from an machine-to-machine application communicating through the wireless network with the machine-to-machine device, when the memory reaches a certain capacity, a number of sales by the machine-to-machine device, a low inventory in the machine-to-machine device, an amount of money collected by the machine-to-machine device, passage of a period of time, and a specified temperature detected by the machine-to-machine device.

17. The wireless network modem dock of claim 1, wherein the data interface is a Universal Serial Bus port.

\* \* \* \* \*